(12) United States Patent
Laig-Hoerstebrock et al.

(10) Patent No.: US 7,609,032 B2
(45) Date of Patent: Oct. 27, 2009

(54) DEVICE AND METHOD FOR ASCERTAINING THE TEMPERATURE IN AN ELECTRICAL BATTERY

(75) Inventors: Helmut Laig-Hoerstebrock, Frankfurt (DE); Sepher Shirazi, Gerbsen (DE)

(73) Assignee: VB Autobatterie GmbH & Co. KGaA, Hannover (DE)

( * ) Notice: Subject to any disclaimer, the term of this patent is extended or adjusted under 35 U.S.C. 154(b) by 354 days.

(21) Appl. No.: 11/346,553

(22) Filed: Feb. 2, 2006

(65) Prior Publication Data

US 2006/0202666 A1  Sep. 14, 2006

(30) Foreign Application Priority Data

Feb. 3, 2005  (DE) .................. 10 2005 004 998

(51) Int. Cl.
*H02J 7/04* (2006.01)
*H02J 7/16* (2006.01)

(52) U.S. Cl. .............. 320/150; 320/153; 324/431

(58) Field of Classification Search .......... 320/150, 320/132, 153; 324/427, 431, 432, 441
See application file for complete search history.

(56) References Cited

U.S. PATENT DOCUMENTS

| | | | |
|---|---|---|---|
| 4,342,963 A | | 8/1982 | Karnowski et al. |
| 5,079,716 A | | 1/1992 | Lenhardt et al. |
| 5,592,094 A | * | 1/1997 | Ichikawa ............... 324/427 |
| 5,699,050 A | * | 12/1997 | Kanazawa ........... 340/636.13 |
| 5,711,605 A | | 1/1998 | Reher et al. |
| 7,317,298 B1 | * | 1/2008 | Burns et al. ............... 320/107 |
| 7,330,013 B2 | * | 2/2008 | Wolin et al. ............... 320/150 |
| 7,492,129 B2 | * | 2/2009 | Aridome ................... 320/150 |
| 2002/0145430 A1 | * | 10/2002 | Arai et al. ................. 324/426 |
| 2004/0032264 A1 | * | 2/2004 | Schoch .................... 324/426 |
| 2004/0100267 A1 | * | 5/2004 | Koch ....................... 324/427 |
| 2004/0174141 A1 | * | 9/2004 | Luz et al. .................. 320/132 |
| 2006/0055374 A1 | * | 3/2006 | Fujihara et al. ............ 320/132 |

FOREIGN PATENT DOCUMENTS

| | | |
|---|---|---|
| DE | 19806135 A1 | 8/1999 |
| DE | 10131259 A1 | 1/2003 |
| DE | 10134065 A1 | 1/2003 |
| DE | 10208651 A1 | 1/2003 |

* cited by examiner

*Primary Examiner*—Patrick J Assouad
*Assistant Examiner*—Arun Williams
(74) *Attorney, Agent, or Firm*—Foley & Lardner LLP

(57) ABSTRACT

A method for ascertaining the temperature in an electrical battery includes determining at least one temperature value at a temperature measuring point outside the battery in the vicinity of the battery; determining at least one electrical power value in dependence on a characteristic power variable associated with the operation of the battery; weighting the power values and the temperature values with an assigned weighting factor; and ascertaining the temperature in the electrical battery from an energy balance in dependence on the at least one weighted temperature value and the weighted electrical power values.

20 Claims, 4 Drawing Sheets

DEVICE AND METHOD FOR ASCERTAINING THE TEMPERATURE IN AN ELECTRICAL BATTERY

CROSS-REFERENCE TO RELATED PATENT APPLICATIONS

This application claims the benefit of German Priority Application DE-10 2005 004 998.2-45 filed on Feb. 3, 2005. The entire disclosure of German Priority Application DE 10 2005 004 998.2-45, including the specification, drawings, claims and abstract, is incorporated herein by reference in its entirety.

BACKGROUND

The present invention relates to a method for ascertaining or determining the temperature in an electrical battery.

Knowledge of the battery temperature is often required for monitoring and/or controlling a battery, for example to establish the charging voltage in dependence on the battery temperature or to ascertain the state of charge as accurately as possible. In this respect there is the problem that, for various reasons, there is no temperature sensor installed in the battery or a temperature sensor cannot be installed in the battery. This causes increased costs to be incurred, for example by providing an additional temperature sensor. Moreover, additional cabling is required at the battery, in order to connect the temperature sensor integrated in the battery to an evaluation unit.

It is therefore proposed in DE 198 06 135 A1 to calculate the temperature of a battery in a vehicle electrical system in dependence on at least two temperatures measured outside the battery on the basis of a thermal model. In this case, allowance is to be made at least for the engine temperature and the ambient temperature.

Furthermore, U.S. Pat. No. 5,079,716 discloses a method for determining the battery temperature by addition of a previously ascertained battery temperature value to the product of the average vehicle speed and the sum of a number of temperature values measured in the vicinity of the battery.

U.S. Pat. No. 5,711,605 describes a method for predicting the battery temperature by determining the air temperature in the vicinity and heat transfer coefficients in conjunction with empirical factors.

DE 101 31 259 A1 also proposes a method for ascertaining a battery temperature in dependence on various temperatures, in particular the engine temperature and the ambient temperature, making allowance for a further temperature of a control device arranged in the immediate vicinity of the battery and the operating state of the control device.

U.S. Pat. No. 4,342,963 describes an automated battery tester which compensates for the influence of the temperature of the electrolyte, in that a connecting part that is provided for the connection to the battery contains a temperature sensor, and the test conditions are changed in dependence on the two measured temperature values obtained before and after connection of the connecting part to the battery.

DE 102 08 651 A1 discloses a method for ascertaining the state of charge of a battery in dependence on a temperature difference which is determined from a thermal balance. The measured temperatures are internal temperatures of the battery and the thermal balance relates to internal processes of the battery.

DE 101 34 065 A1 describes a method for predicting the electrical load capacity of a storage battery, in which allowance is made for the thermal effects associated with the current flow through the battery. In this case, an adjustment takes place between the ambient temperature and the battery temperature. The thermal balance makes allowance for the Joulean heat caused by the battery being heated up by the flow of current and a reversible heating output.

It would be desirable to provide an improved method and an improved device for ascertaining the temperature in an electrical battery by measuring at least one temperature value at a respective temperature measuring point outside the battery in the vicinity of the battery, in order to be able to determine the battery temperature still more accurately.

SUMMARY

An exemplary embodiment of the invention relates to a method for ascertaining the temperature in an electrical battery that includes determining at least one temperature value at a temperature measuring point outside the battery in the vicinity of the battery; determining at least one electrical power value in dependence on a characteristic power variable associated with the operation of the battery; weighting the power values and the temperature values with an assigned weighting factor; and ascertaining the temperature in the electrical battery from an energy balance in dependence on the at least one weighted temperature value and the weighted electrical power values.

Another exemplary embodiment of the invention relates to a device for ascertaining the temperature in an electrical battery that includes at least one temperature sensor arranged outside a battery in the vicinity of the battery; a voltmeter for measuring battery terminal voltage; and a device for ascertaining battery terminal current and having an evaluation unit, which is connected to the at least one temperature sensor, the voltmeter, and the device for ascertaining the battery terminal current. The device is designed for carrying out the method comprising the steps of: determining at least one temperature value at a temperature measuring point outside the battery in the vicinity of the battery; determining at least one electrical power value in dependence on a characteristic power variable associated with the operation of the battery; weighting the power values and the temperature values with an assigned weighting factor; and determining the temperature in the electrical battery from an energy balance in dependence on the at least one weighted temperature value and the weighted electrical power values.

DETAILED DESCRIPTION

Figure 1:
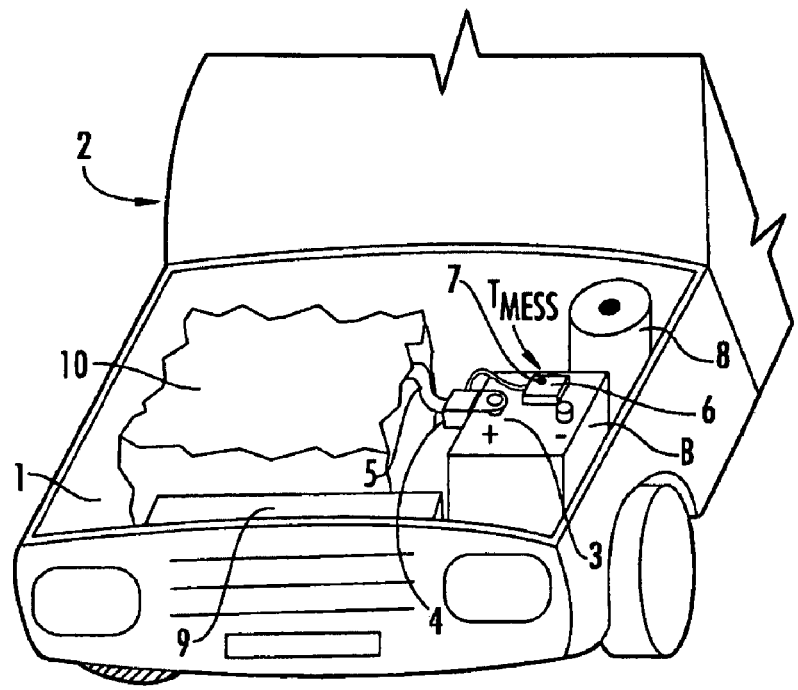
FIG. 1 shows a diagram of a starter battery in a motor vehicle with a shunt at the pole terminal and an evaluation unit.

According to an exemplary embodiment, a method is utilized for ascertaining the electrical power converted at at least one temperature measuring point as a further electrical power value, weighting the electrical power values and temperature values in each case with an assigned weighting factor and ascertaining the temperature in the electrical battery from an energy balance in dependence on the at least one weighted temperature value and the weighted electrical power values.

According to an exemplary embodiment, a method for ascertaining the temperature in an electrical battery involves determining at least one temperature value at a respective temperature measuring point outside the battery in the vicinity of the battery, and ascertaining at least one electrical power value in dependence on a characteristic power variable associated with the operation of the battery.

A device for ascertaining the temperature in an electrical battery may also be provided that includes at least one temperature sensor, arranged outside the battery in the vicinity of the battery, a voltmeter for measuring the battery terminal voltage, a device for ascertaining the battery terminal current and having an evaluation unit, which is connected to the at least one temperature sensor, the voltmeter and the device for ascertaining the battery terminal current.

The additional ascertainment and inclusion of the electrical power converted at the temperature measuring point in conjunction with the known use of temperature values from the vicinity of the battery make it possible to determine the battery temperature much more accurately by simple measures.

The power loss at the temperature measuring point is generally so small (for example 0.5 W) that it does not directly change the battery temperature, but it does influence the temperature measurement. It has been found that allowance can be made for the falsifying influence of the power loss at the temperature measuring point quite easily by integrating the power loss of the temperature measuring point into the power term N with a suitable factor.

The additional evaluation of the power loss of the measuring device weighted with an appropriate weighting factor allows better account to be taken of the important temperature sources and temperature sinks. The current battery temperature is preferably ascertained by integrating the sum ascertained over time of the at least one electrical power value and at least one temperature value. However, it is particularly advantageous if the at least one electrical power value and at least one temperature value are continuously summated in discrete time steps from the immediately previously ascertained battery temperature to ascertain the current battery temperature. The current battery temperature is consequently determined from the energy balance by evaluation of the converted power and changes in temperature.

The weighting factors may in this case be chosen in dependence on the current operating state of the battery and are preferably chosen in dependence on the heat transfer values of the battery and the heat transfer values of the vicinity of the assigned object. It is advantageous if the weighting factors are chosen in dependence on the specific vicinity, in particular on the type of a motor vehicle, and the type of battery.

Consequently, by the correct selection of the weighting factors, the basic principle of battery temperature ascertainment from the electrical power values and temperature values is adapted to the actual installation situation of the battery and the type of battery. Weighting factors can be easily found by a person skilled in the art by means of trials.

The battery terminal current measured at the battery terminals is suitable for example as the characteristic power variable for ascertaining the electrical power values. This is both a measure of the electrical power converted in the battery and a measure of the power losses converted at the electrical components connected to the battery, which lead to the development of heat.

There are sometimes situations in which other objects with a great thermal capacity, for example a container of the windscreen washing system, are also located close by the battery. In this case, it must be estimated, at best experimentally on the vehicle, what the situation is.

The simplest case exists if the container is far enough away from the battery that it coincides with the vicinity taken into account by $T_{Mess}$. Then the method previously described applies.

In another case, the container lies very close to the battery. It is then necessary to distinguish between (a) the time constant of the container for temperature equalization is very small (then, instead of the thermal capacity of the battery $C_B$, the sum of the thermal capacities of the battery and the container can be taken for normalization) and (b) the time constant of the container corresponds approximately to the time constant of the battery. In this case, the differential equation of the container can also be resolved simultaneously, for example if $T_O$ is the temperature of the object and $C_O$ is the thermal capacity of the object, and the following approximately applies:

$$T_O = T_{O-1} + (k_{O1} \cdot T_B + k_{O2} \cdot T_{Mess} - k_{O0} \cdot T_{O-1})/C_O \; mit \; k_{O1} + k_{O2} = K_{O0}$$

with constants $k_{O1}$, $k_{O2}$ and $k_{O0}$ to be determined appropriately.

In the case of a vehicle battery, the ascertainment of the battery temperature preferably takes place with a system of equations of the kind:

$$T_B = T_{B-1} + N/C_B \cdot dt + \left\{ \sum_{i=1}^{n} k_1 \cdot T_1 - k_0 \cdot T_{B-1} \right\} \Big/ C_B \cdot dt$$

where $T_{B-1}$ is the previously calculated battery temperature $T_B$, $C_B$ is the thermal capacity of the battery, $k_i$ with i=1 to n (integers) are the weighting factors and $T_i$ is at least one (n=1) further temperature value measured at objects in the vicinity of the battery, and where N is the electrical power value. A temperature value $T_I$ may be, for example, the engine temperature of a vehicle engine arranged in the vicinity of the battery. Another temperature value $T_I$ may be the temperature measured with a temperature sensor integrated in a measuring circuit.

It is clear that the power value related to the thermal capacity of the battery in discrete time steps dt and the weighted sum of all the measured temperature values less the weighted previously calculated battery temperature related to the thermal capacity of the battery are added in a time step to the previously calculated battery temperature in order to obtain the current battery temperature. The power values related to the thermal capacity of the battery have the effect that the thermal balance that is usually ascertained exclusively from the temperature values is supplemented by the main influencing factors, so that the ascertained battery temperature coincides much better with the actual battery temperature.

In this case, the sum of the weighting factors should be equal to the weighting factor $k_0$ for the previously ascertained battery temperature. This is so because it has been found that the precision of the method can be increased considerably in this way.

The electrical power value is preferably calculated with a system of equations of the kind:

$$N = N_B + \sum_{j=1}^{m} k_j \cdot N_j$$

where $N_B$ is a value proportional to the electrical power converted by the battery, $N_j$ are values proportional to electrical powers converted by electrical components in the vicinity of the battery, and $k_j$ are weighting factors. These weighting factors $k_j$ can be determined for a type of vehicle and type of battery by means of trials.

The power value $N_B$ proportional to the power converted by the battery is preferably the product of the battery terminal current and the difference between the battery terminal voltage and the battery open-circuit voltage ($N_B=(U-U_{00})\cdot I$). The method can be improved further by the battery open-circuit voltage value $U_{00}$ being corrected by a constant voltage value characteristic of the battery system, which describes the heat effect of the electrochemical reactions. In the case of a lead-acid storage battery, the battery open-circuit voltage $U_{00}$ is preferably lowered by about 0.06 V/cell.

A further improvement is possible in some cases in which the battery terminal current I is not completely converted in the main reaction $I^H$ (charging or discharging reaction), but partly in a secondary reaction $I^N$, such as for example in water electrolysis, and/or the internal oxygen cycle ("gas consumption") in the case of sealed lead-acid storage batteries:

$$I = I^H + I^N.$$

Then, the open-circuit voltage of the respective reaction, corrected by a constant describing the heat effect of the reaction, is used as the open-circuit voltage for each current contribution $I_j$, that is for example $$N_B = (U - U_{00}^H) \cdot I^H + (U - U_{00}^N) \cdot I^N.$$

For the main reaction, the open-circuit voltage $U_{00}^H$ used is the voltage already considered above of the equilibrated battery. For the secondary reactions, a value of about 1.48 V/cell is to be used as open-circuit voltage $U_{00}^N$ for the secondary reaction of the water electrolysis and a value of about 0.0 V/cell is to be used for the oxygen cycle.

A further electrical power value may describe the power converted by a shunt introduced into the circuit. This shunt power value is in this case calculated as a product of the shunt resistance by the square of the battery terminal current.

A further electrical power value is the electrical power converted at the at least one temperature measuring point outside the battery. It is particularly advantageous in this respect if the temperature is determined by a temperature sensor that is present in any case on a measuring circuit. In this case, however, this temperature value is also influenced by the electrical power that is converted in the measuring circuit. This electrical power should therefore be determined separately in dependence on the current and/or voltage measured at the measuring circuit or by other suitable measured variables for the electrical power converted in the measuring circuit. This allows the electrical power values and temperature values determined for the measuring circuit to be decoupled from one another.

The object is also achieved by the device of the generic type having an evaluation unit which is designed for carrying out the aforementioned method, for example by programming a microprocessor or microcontroller. However, the evaluation unit may also be hard-wired as an ASIC.

FIG. 1 shows a diagram of an engine compartment 1 of a motor vehicle 2 with a battery B of a lead-acid storage battery as a starter battery. Connected to the battery terminal 3 for the positive pole is a shunt 4, which has a shunt resistance $R_S$. From the shunt 4, a copper cable 5 runs to the loads of the vehicle, such as for example the starter and alternator. From the shunt 4 there also extends a power cable to a measuring circuit 6, which takes the form of an ASIC (application-specific integrated circuit). The measuring circuit 6 has an integrated temperature sensor 7 and preferably an evaluation unit for determining the battery temperature $T_B$ in the battery B.

In addition to the battery B, further heat sources and heat sinks are installed in a known way, such as for example a washing water container 8 for windscreen washing water, a radiator 9 and a combustion engine 10.

Figure 2:
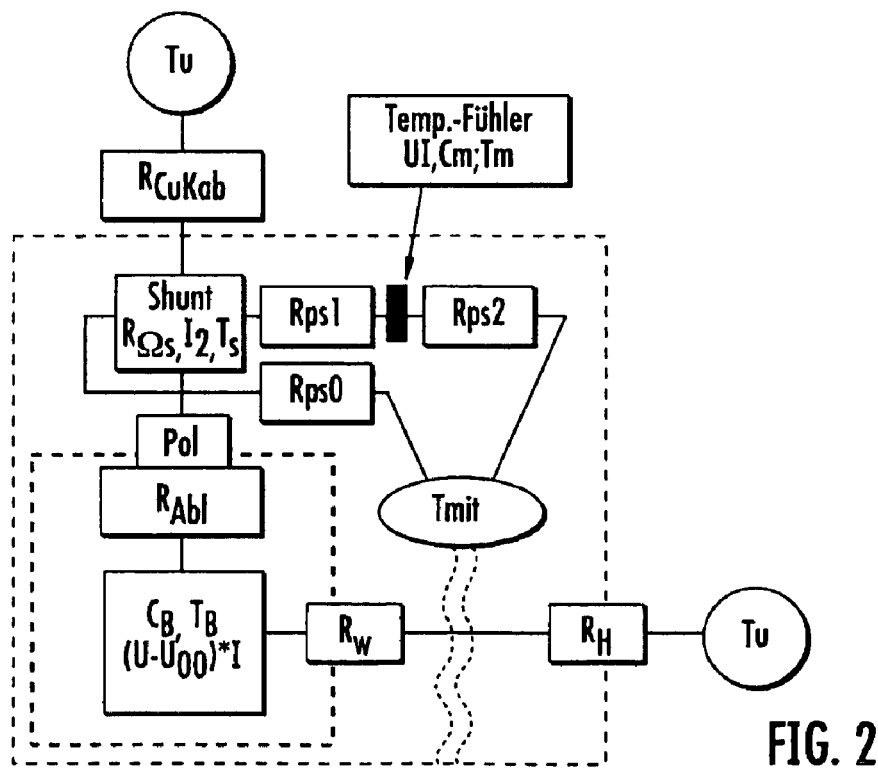
FIG. 2 shows a block diagram of a battery with loads connected to it to represent heat sources and heat sinks.

FIG. 2 shows a block diagram of the arrangement represented in FIG. 1 with the heat sources and heat sinks.

The battery B has a thermal capacity $C_B$ and an internal battery temperature $T_B$ to be ascertained. The thermal capacity $C_B$ is assumed to be known and can easily be determined for each type of battery.

For the power converted in the battery B, an electrical power value $N_B$ is ascertained from the product of the battery terminal current I and the difference between the battery terminal voltage U and the open-circuit voltage $U_{00}$.

$$N_B = (U - U_{00}) \cdot I$$

It is also possible to make allowance for the case where the battery terminal current I is not completely converted in the main reaction (charging or discharging reaction) (main reaction current $I^H$), but partly in a secondary reaction (secondary reaction current $I^N$), such as for example in water electrolysis and/or the internal oxygen cycle ("gas consumption"). In the case of sealed lead-acid storage batteries:

$$I = I^H + I^N.$$

Then, the open-circuit voltage $U_{00}^H$ of the main reaction and $U_{00}^N$ of the secondary reaction, corrected by a constant describing the heat effect of the reaction, is used as the open-circuit voltage D for each current contribution $I_j$. This may take place for example on the basis of the formula:

$$N_B = (U - U_{00}^H) \cdot I^H + (U - U_{00}^N) \cdot I^N$$

For the main reaction, the open-circuit voltage $U_{00}^H$ used is the voltage of the equilibrated battery. For the secondary reactions, a value of about 1.48 V/cell is to be used as open-circuit voltage $U_{00}^N$ for the secondary reaction of the water electrolysis and a value of about 0.0 V/cell is to be used for the oxygen cycle.

FIG. 2 shows that, of the heat generated in the battery B, thermal energy is dissipated via the thermal resistance $R_W$ of the battery wall and possibly the thermal resistance $R_H$ of the casing for the battery B to the vicinity, and vice versa, so that the outside temperature $T_U$ and the internal battery temperature $T_B$ are in an interactive relationship with each other.

Furthermore, thermal energy flows via the thermal resistance $R_{Ab1}$ of the lead discharge in the battery B to the pole 3 of the battery B and from there to the shunt 4. The shunt temperature $T_S$ is determined by this heat flow and by the heat generated by the shunt 4 as a result of the current flow through the shunt 4. Therefore, a further electrical power value $N_S$ is determined as the product of the electrical resistance $R_{\Omega S}$ of the shunt 4 and the square of the battery current. The shunt 4 is coupled with the temperature sensor 7, which is arranged at or in the measuring circuit 6 and is influenced by the temperature $T_{mit}$ in the vicinity of the temperature sensor 7. The thermal resistances $R_{PS1}$, $R_{PS2}$ and $R_{PS3}$ at the temperature sensor 7 determine the further heat flow from the shunt 4 to the temperature sensor 7 and also from the shunt 4 and the measuring circuit 6 to the vicinity of the temperature sensor 7. This temperature $T_{mit}$ in the vicinity of the temperature sensor 7 is consequently determined essentially by the heat flow from the shunt 4, from the measuring circuit 6 and from the battery 1 into the vicinity.

Furthermore, there is a heat flow from the shunt 4 via the copper cable 5 into the vicinity, the heat flow being influenced by the thermal resistance $R_{CuKab}$ of the copper cable 5.

To make allowance for an electrical power value $N_{Mess}$ of the measuring circuit 6 and a temperature value $T_{Mess}$ of the measuring circuit 6, it is also possible to use the voltage U, the current I and the thermal capacity $C_{Mess}$ of the measuring circuit 6 and their immediate vicinity.

In the case of the method, allowance is made essentially for the battery B, the shunt 4 and the measuring circuit 6 as heat sources. If appropriate, allowance may also be made for the electrical power and/or temperature of adjacent objects, such as the washing water container 8, the radiator 9 or the engine 10. Since the washing water container 8 is normally a heat sink, this can be used as an influencing variable for ascertaining the battery temperature $T_B$ by the washing water temperature $T_W$ related to the current thermal capacity $C_W$ of the washing water container 7 and its content. The thermal capacity $C_W$ of the washing water container 7 is in this case strongly dependent on the filling level in the washing water container 8.

The heat paths are as follows:

The main heat path leads from the battery B via the thermal resistance $R_W$ of the battery wall, and if appropriate the thermal resistance $R_H$ of the casing for the battery B, outwards to the outside temperature $T_U$.

Part of the heat flows via the electrical conductor from the battery B via the thermal resistance $R_{Ab1}$ of the lead discharge to the pole 3 and to the shunt 4 and also the battery cable 5 with the thermal resistance $R_{CuKab}$ into the vicinity with the outside temperature $T_U$.

A smaller heat outflow leads from the shunt 4 via the thermal resistance $R_{PS1}$ between the shunt 4 and the temperature sensor 7 to the measuring circuit 6 with the temperature sensor 7. From there, heat is dissipated via the thermal resistance $R_{PS2}$ between the temperature sensor 7 and the vicinity of the temperature sensor 7 with the temperature $T_{mit}$.

A small amount of heat flows in parallel from the shunt 4 via the thermal resistance $R_{PS0}$ between the shunt 4 and the vicinity of the temperature sensor 7 with the temperature $T_{mit}$.

In the simplest embodiment, the battery temperature $T_B$ in the interior of the battery B is ascertained from the temperature $T_M$ measured with the temperature sensor 7 at the temperature measuring point in the vicinity of the battery B and also the electrical power values $N_B$ of the battery, $N_S$ of the shunt and $N_{Mess}$ of the measuring circuit 6 with the following equation:

$$T_B = T_{B-1} + N/C_B \cdot dt + \{k_0 \cdot T_{Mess} - k_0 \cdot T_{B-1}\}/C_B \cdot dt$$

and $$N = N_B + k_{N1} \cdot N_S + k_{N2} \cdot N_{Mess}.$$

where $T_{B-1}$ is the battery temperature ascertained in the previous time interval dt, $C_B$ is the thermal capacity of the battery, $k_0$ is a weighting factor for the temperature values and $k_{N1}$ and $k_{N2}$ are weighting factors for the electrical power values $N_S$ and $N_{Mess}$.

The weighting factors $k_0$ for the temperature value $T_{Mess}$ and for the previously ascertained battery temperature $T_{B-1}$ are chosen to be equal, since, when there are a number of temperature values, the sum of the associated weighting factors $k_i$ should be equal to the weighting factor $k_0$ for the previously ascertained battery temperature $T_{B-1}$.

The electrical power values $N_B$, $N_S$ and $N_{Mess}$ are summated in a weighted form and give a resultant electrical power value N.

With this system of equations, approximate allowance is made for the situation where the temperature sensor 7 does not register the true ambient temperature at the place where the battery B is installed, for example under the bonnet or in the engine compartment, but is arranged particularly near to the battery. Furthermore, allowance is made for the main local heat sources which influence the temperature measurement by the temperature sensor 7 at the measuring circuit 6, for example the electronic heating of the temperature sensor 7 directly or the shunt 4 heating up in the neighbourhood of the temperature sensor 7.

The power value $N_B$ for the battery is ascertained from the battery terminal voltage U and the open-circuit voltage $U_{00}$ as well as the battery terminal current I from the formula $$N_B = (U - U_{00}) \cdot I$$

The power value $N_S$ for the shunt 4 is ascertained on the basis of the formula $$N_S = R_S \cdot I^2$$

where $R_S$ is the shunt resistance. The electrical power value $N_{Mess}$ of the measuring circuit 6 can be ascertained by a temperature measurement in the measuring circuit 6 and, if appropriate, with allowance for the voltage U, the current I and the thermal capacity $C_{Mess}$ of the measuring circuit 6. In this of this case, the electrical power value $N_{Mess}$ of the measuring circuit 6 can also be assumed as a constant. The shunt resistance $R_S$ and the electrical power value $N_{Mess}$ of the measuring circuit 6 do not necessarily have to be known as values but may also be integrated in the constants $k_{N1}$ and $k_{N2}$ to be determined. The constants k can be determined by means of calculated thermal resistances, for example with the aid of an engine compartment simulator or by a series of representative measuring trips with the respective type of car and type of battery, and can then be adopted for all vehicles of this type of construction. The constants k found in this way may depend on the temperature and/or the driving situation.

The method can be carried out in a still more sophisticated and precise manner if allowance is made for further temperatures $T_i$, such as for example the engine temperature, the outside temperature, the radiator temperature, the washing water temperature etc., further heat sources, such as for example the engine, in the vehicle, and further heat sinks, for example the washing water container. These do not have to be known very accurately, but can be approximately estimated. Then, the battery temperature $T_B$ can be ascertained with the following generalized system of equations:

$$T_B = T_{B-1} + N/C_B \cdot dt + \left\{ \sum_{i=1}^{n} k_1 \cdot T_1 - k_0 \cdot T_{B-1} \right\} / C_B \cdot dt$$

and $$N = N_B + k_{Nj} \cdot N_S + k_{N2} \cdot N_{Mess} + \sum_{j=3}^{m} k_{Nj} \cdot N_j.$$

Sometimes, the power values N cannot be given precisely. A formal approach of the form:

$$N = N_B + k_{N0} + k_{NIj} \cdot I + k_{NI2} \cdot I^2$$

is then very useful. In this case, the components that are constant, proportional to the current I and proportional to the square of the current $I^2$ are separated. On the basis of a number of trials with greatly varying current values I, the constants k are adapted. Analogous combinations with the battery voltage U are also possible.

In this case, the sum of the weighting factors $k_i$ for the temperature values T should be equal to the weighting factor $k_0$ for the previously ascertained battery temperature $T_{B-1}$:

$$\sum_{i=j}^{n} k_i = k_0.$$

Allowance can be made for the engine power, for example by the cooling water temperature and oil temperature as power value $N_j$ or preferably as temperature value $T_j$.

To resolve the algorithm, knowledge of the initial battery temperature is required. There are various ways of going about this:

For long periods of inactivity it is the case that the battery temperature $T_B$ is equal to the temperature of the measuring point $T_{Mess}$ ($T_B = T_{Mess}$).

For shorter periods between driving, even in this period of inactivity the battery temperature $T_B$ should still continue to be calculated in accordance with the algorithm.

To determine the constants, the car should be driven at different outside temperatures $T_U$ to obtain complex driving profiles, each subprofile (urban driving, motorway driving, standstill) should be adequately long, for example two hours or more, and should lead alternately to significant heating up of the battery B, preferably by more than 30° C., and cooling down again. Moreover, to ascertain the weighting factors k, allowance should be made for very different current loads i on the battery 1.

Figure 3:
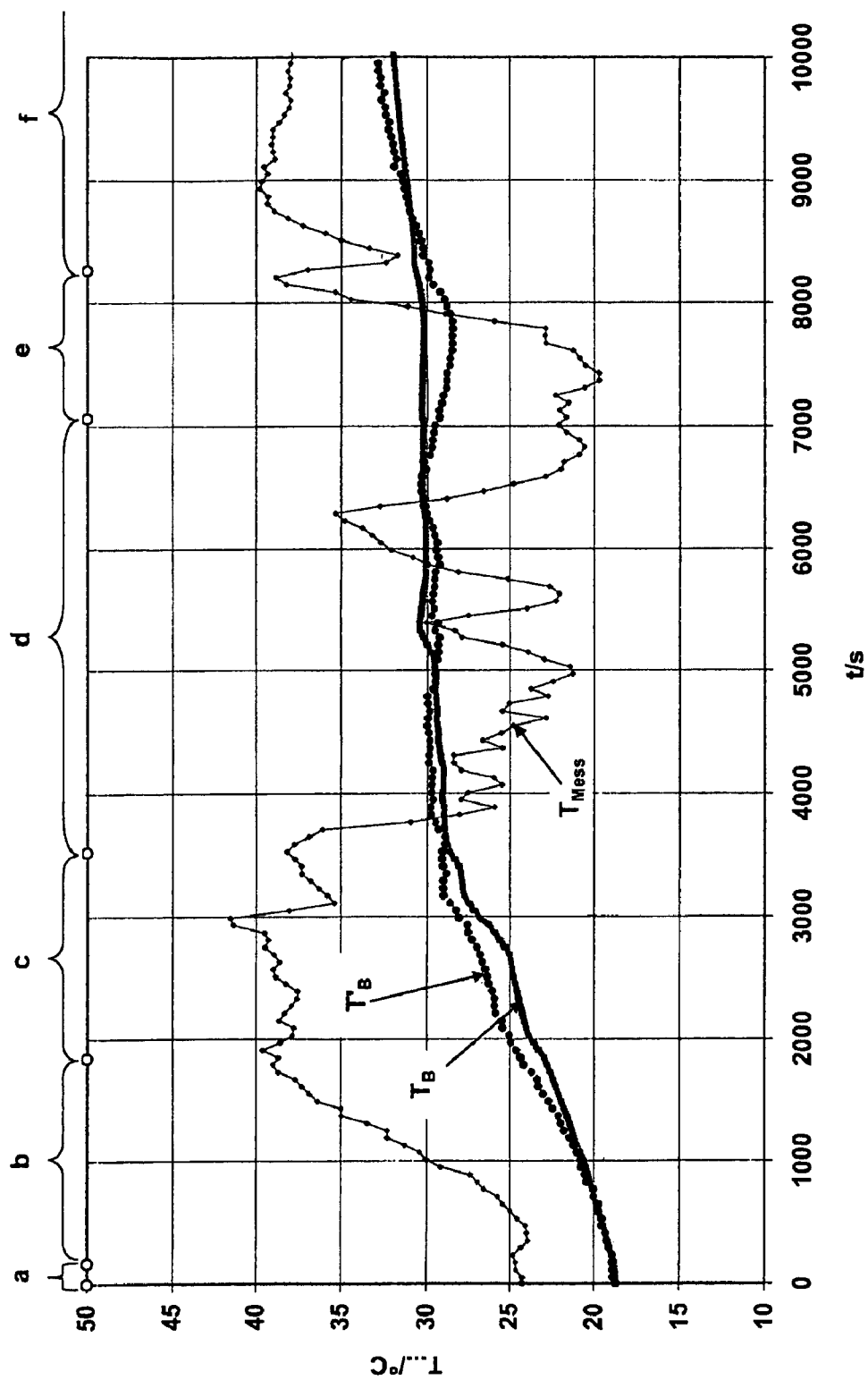
FIG. 3 shows a diagram of the temperature measured with a temperature probe in the proximity of the battery, the actual battery temperature and the temperature ascertained with the method according to the invention in the case of a 44 Ah battery, which is installed in a Ford Fiesta 1.4.

FIG. 3 shows a diagram of the temperature $T_{Mess}$ recorded with a temperature sensor 7 in the vicinity of the battery 1, the actual battery temperature $T_B$ and the battery temperature $T'_B$ ascertained with the method according to the invention over the time t of 10,000 seconds. The battery 1 investigated is a lead-acid storage battery with a capacity of 44 Ah, installed in a Ford Fiesta with a 1.4-litre petrol engine.

For this type of battery and type of car, a weighting factor $k_0 = 1.487$ W, a weighting factor $k_{N0} = 0.444$ for a constant power component of arbitrarily 1 W, a weighting factor $k_{N1} = 0.785$ V for all thermal outputs that are proportional to the battery current I and a weighting factor $k_{N2} = 7.279$ E-3Ω for all thermal output components that are proportional to the square of the battery current I were found by trials under different conditions and driving profiles with a battery thermal capacity of 13,000 Ws/K.

In a first phase a), the battery B was in the inoperative state and the temperature T was approximately constant at about 24° C. Subsequently, the engine was operated idling without any load in a phase b). This led to a rise in the measured temperature $T_{Mess}$ to approximately 40° C. It is evident that the actual battery temperature $T'_B$ is much lower and rose from approximately 18° C. to about 25° C. In a third phase c), the engine was operated idling with a load, i.e. switched-on electric loads. This led to a fluctuation of the measured battery temperature $T_{Mess}$ and a further rise in the battery temperature $T_B$ to approximately 30° C. It is also evident that the temperature $T_B$ ascertained with the system of equations described above has approximately the same profile as the actual battery temperature $T'_B$, although the measured temperature $T_{Mess}$ has a completely different profile. In a fourth phase d), the vehicle was operated in urban traffic. This led to a great fluctuation of the measured temperature $T_{Mess}$, which is greatly influenced by deceleration and acceleration, throttle lift-off and altered convection. In the driving phase d), the actual battery temperature $T'_B$ remained approximately constant at 30° C. with slight fluctuations. The ascertained battery temperature $T'_B$ differs only slightly in the profile from the actual battery temperature $T'_B$ and is sufficiently accurate for a subsequent evaluation. In a fifth phase e), the vehicle was driven on a motorway, which after a delay leads to a strong rise in the measured battery temperature $T_{Mess}$ because of the accompanying strong rise in the engine temperature. The actual battery temperature $T'_B$ and the battery temperature $T_B$ calculated from the measured battery temperature $T_{Mess}$ do not follow this in the short time. In the subsequent inoperative phase f), the measured temperature $T_{Mess}$ in the vicinity of the battery 1 drops exponentially after a short overshoot of the temperature $T_{Mess}$ because of the still very hot engine. The actual battery temperature $T'_B$ and the battery temperature $T_B$ ascertained with the method according to the invention exhibit a profile deviating from the measured temperature $T_{Mess}$ and agree relatively well.

As already mentioned, by making allowance for further heat sources, heat sinks and electrical power values, the accuracy of the method can be increased still further, so that the deviation, in particular in driving phase d), between the ascertained battery temperature $T_B$ and the actual battery temperature $T'_B$ is reduced.

Figure 4:
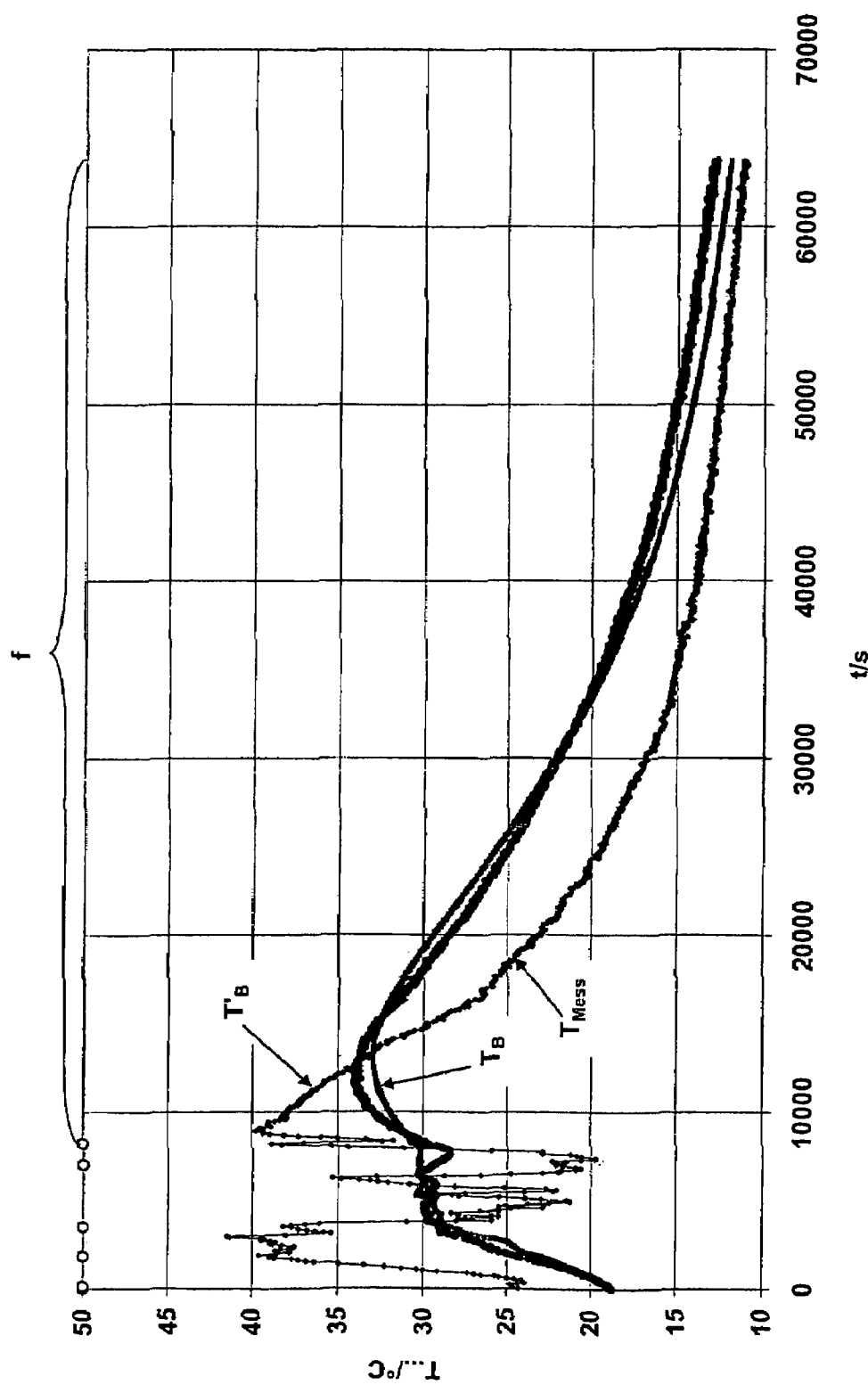
FIG. 4 shows an enlarged representation of a detail from the diagram in FIG. 3 for the time range from 0 to 10,000 seconds.

FIG. 4 shows trials carried out on two different days, simply shown one after the other in the representation.

For such an arrangement, with an assumed battery thermal capacity of CB=14,000 Ws/K, a weighting factor $k_0 = 0.973$ W, a weighting factor $k_{N0} = -21.951$ for a constant power component of 0.5 W at the heating resistor, a weighting factor $k_{N1} = -1.387$ V for all thermal outputs that are proportional to the battery current I and a weighting factor $k_{N2} = -5.05$ E-2Ω for all thermal outputs components that are proportional to the square of the battery current $I^2$ were found.

Figure 5:
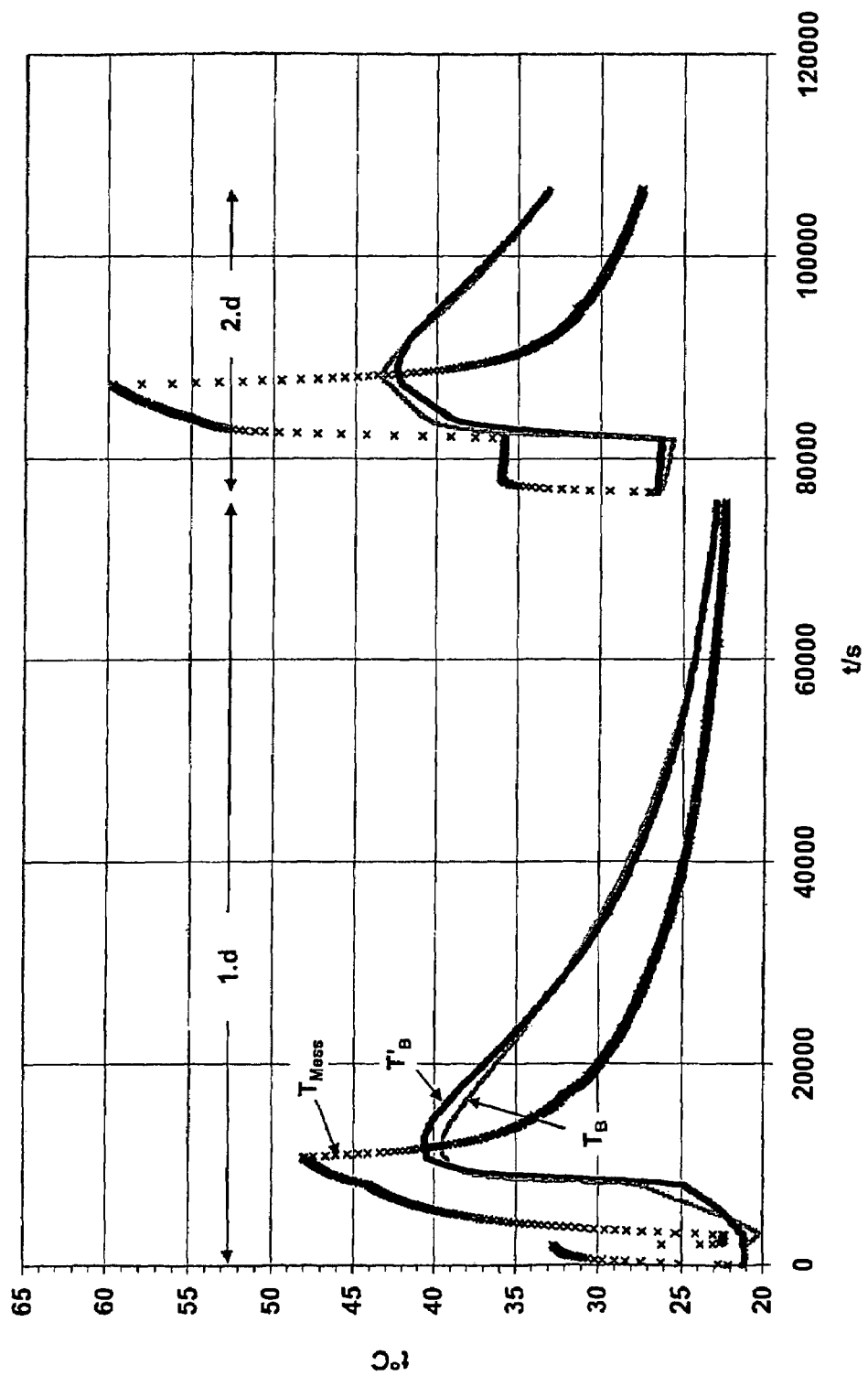
FIG. 5 shows a diagram of the measured and actual temperature over time in the case of a 12 V/48 Ah battery and an additional heat source in the proximity of the temperature sensor.

FIG. 5 shows a further example, in which an additional electrical thermal input takes place in the proximity of the temperature measuring point. In an engine compartment simulated in a laboratory, a 12 V battery with 48 Ah was subjected to various thermal and current loads. In the proximity of the temperature measuring point which is provided in a plastic housing on the pole of the battery, there is an electrical resistance, on which a fixed heating output of 0.5 W is impressed by a defined current load. This replicates the situation in which the temperature measuring point is closely associated spatially with a measuring circuit and so the measured temperature $T_{Mess}$ is greatly influenced by the electrical power loss of this measuring circuit.

Once the heating output is switched on, after a few minutes the temperature measuring point assumes a temperature approximately 11° higher than the vicinity. FIG. 5 clearly shows that, making allowance for this known heating output with suitable constants k, the algorithm according to the invention can nevertheless reproduce well the profile of the battery temperature $T_B$ even in different operating situations, such as for example at a standstill, strong convection such as during driving, with or without electrical loading of the battery, etc.

What is claimed is:

1. A method for ascertaining the temperature in an electrical battery using a measuring circuit comprising:
   receiving at least one temperature value from a temperature sensor at a temperature measuring point outside the battery in the vicinity of the battery;
   determining at least one electrical power value in dependence on a characteristic power variable associated with the operation of the battery;
   using the measuring circuit to assign the power values and the temperature values with a weighting factor; and
   using the measuring circuit to ascertain the temperature in the electrical battery from an energy balance equation in dependence on the at least one weighted temperature value and the weighted electrical power values.

2. The method of claim 1, further comprising integrating over time at least one electrical power value and at least one temperature value.

3. The method of claim 1, further comprising normalizing the at least one power value and continuously summing the at least one normalized power value and at least one temperature value in discrete time steps from the immediately previously ascertained battery temperature to ascertain the current battery temperature.

4. The method of claim 1, wherein the weighting factor is chosen in dependence on the current operating state of the battery.

5. The method of claim 1, wherein a characteristic power variable is the battery terminal current that can be measured at the battery terminals.

6. The method of claim 1, wherein the power values and temperature values are related to the thermal capacity of the battery.

7. The method of claim 1, wherein the temperature values are related to the thermal capacity of an assigned object at which the temperature is determined.

8. The method of claim 1, wherein the power values and temperature values are related to the sum of the thermal capacity of the battery and at least one further thermal capacity of an object contributing to the temperature equalization.

9. The method of claim 1, wherein the temperature value of an object contributing to the temperature equalization is determined with a system of equations of the kind:

$$T_O = T_{O-1} + (k_{O1} \cdot T_B + k_{O2} \cdot T_{Mess} - k_{O0} \cdot T_{O-1})/C_O dt$$

and $$k_{O1} + k_{O2} = k_{O0}$$

where $C_O$ is the thermal capacity of the object, $T_B$ is the battery temperature, $T_{Mess}$ is the temperature measured at the temperature measuring point, $T_{O-1}$ is the temperature value of the object determined previously in time and $k_{O1}$, $k_{O2}$ and $k_{O0}$ are fixed constants.

10. The method of claim 1, further comprising ascertaining the battery temperature with a system of equations of the kind $$T_B = T_{B-1} + N/C_B \cdot dt + \left\{ \sum_{i=1}^{n} k_1 \cdot T_1 - k_0 \cdot T_{B-1} \right\} \Big/ C_B \cdot dt$$

where $T_{B-1}$ is the previously calculated battery temperature $T_B$, $C_B$ is the thermal capacity of the battery, $k_i$ with i=1 to n are the weighting factors and $T_i$ is at least one (if n=1) temperature value measured at objects i in the vicinity of the battery, and where N is the power value.

11. The method of claim 10, wherein the sum of the weighting factors $$\sum_{i=1}^{n} k_1$$

is equal to the weighting factor $k_o$ for the previously ascertained battery temperature.

12. The method of claim 1, wherein the power value is calculated with a system of equations $$N = N_B + \sum_{j=1}^{m} k_j \cdot N_j$$

where $N_B$ is a value proportional to the electrical power converted by the battery, $N_j$ are values proportional to powers converted by components in the vicinity of the battery, and $k_j$ are weighting factors.

13. The method of claim 12, wherein the power value proportional to the power converted by the battery is the product of the battery terminal current and the difference between the battery terminal voltage and the battery open-circuit voltage.

14. The method of claim 13, wherein the battery open-circuit voltage value is corrected by a constant voltage value characteristic of the battery system.

15. The method of claim 14, wherein the constant voltage value for a lead-acid storage battery is in the range from −0.04 to −0.08 V/cell.

16. The method of claim 1, wherein a further electrical power value describes the power converted by a shunt introduced into the battery circuit, and the shunt power value is calculated as the product of the shunt resistance and the square of the battery terminal current.

17. The method of claim 1, wherein a further electrical power value is the electrical power converted in a measuring circuit, and this electrical power is determined in dependence on the current and voltage measured at the measuring circuit.

18. The method of claim 1, wherein the weighting factor is dependent on the heat transfer values of the battery and the heat transfer values of the vicinity of an assigned object at which the temperature is determined.

19. The method of claim 1, wherein the weighting factors are chosen based on the specific vicinity, on the type of a motor vehicle, and on the type of battery.

20. A device for ascertaining the temperature in an electrical battery comprising:
   at least one temperature sensor arranged outside a battery in the vicinity of the battery;
   a voltmeter for measuring battery terminal voltage; and
   a device for ascertaining battery terminal current and having an evaluation unit, which is connected to the at least one temperature sensor, the voltmeter, and the device for ascertaining the battery terminal current, and is designed for carrying out a method comprising the steps of:
   determining at least one temperature value at a temperature measuring point outside the battery in the vicinity of the battery;

determining at least one electrical power value in dependence on a characteristic power variable associated with the operation of the battery;

assigning the power values and the temperature values with a weighting factor; and determining the temperature in the electrical battery from an energy balance equation in dependence on the at least one weighted temperature value and the weighted electrical power values.

* * * * *